United States Patent
Rumez et al.

(10) Patent No.: US 6,167,703 B1
(45) Date of Patent: Jan. 2, 2001

(54) INTERNAL COMBUSTION ENGINE WITH VTG SUPERCHARGER

(75) Inventors: Werner Rumez, Muhlacker; Erwin Schmidt, Baltmannsweiler; Siegfried Sumser, Stuttgart, all of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/276,609

(22) Filed: Mar. 25, 1999

(51) Int. Cl.[7] ................................................. F02B 29/04
(52) U.S. Cl. .............................. 60/599; 60/602; 60/605.1
(58) Field of Search ........................... 60/599, 602, 605.1

(56) References Cited

U.S. PATENT DOCUMENTS

| | | | |
|---|---|---|---|
| 5,927,075 | * | 7/1999 | Khair .................................... 60/605.2 |
| 5,996,347 | * | 12/1999 | Nagae et al. ............................ 60/602 |

FOREIGN PATENT DOCUMENTS

| | | |
|---|---|---|
| 40 25 901 C1 | 1/1992 | (DE) . |
| 63-159619 | 7/1988 | (JP) . |
| 4-47157 | * 2/1992 | (JP) . |

* cited by examiner

Primary Examiner—Noah P. Kamen
(74) Attorney, Agent, or Firm—Kenneth H. Maclean

(57) ABSTRACT

An exhaust gas turbocharging system for an internal combustion engine including a turbine portion with adjustable turbine geometry for powering a compressor portion which delivers a pressurized charge air mass flow to the internal combustion engine air intake. A charge regulator controls the turbine geometry so that the cross-section of exhaust gas flow to the turbine portion is decreased with an increased working load of the internal combustion engine. It is further proposed that at least one heat exchanger is exposed to the charge air circuit so that heated air is fed thereto for heating such as to heat engine lubricating oil.

13 Claims, 1 Drawing Sheet

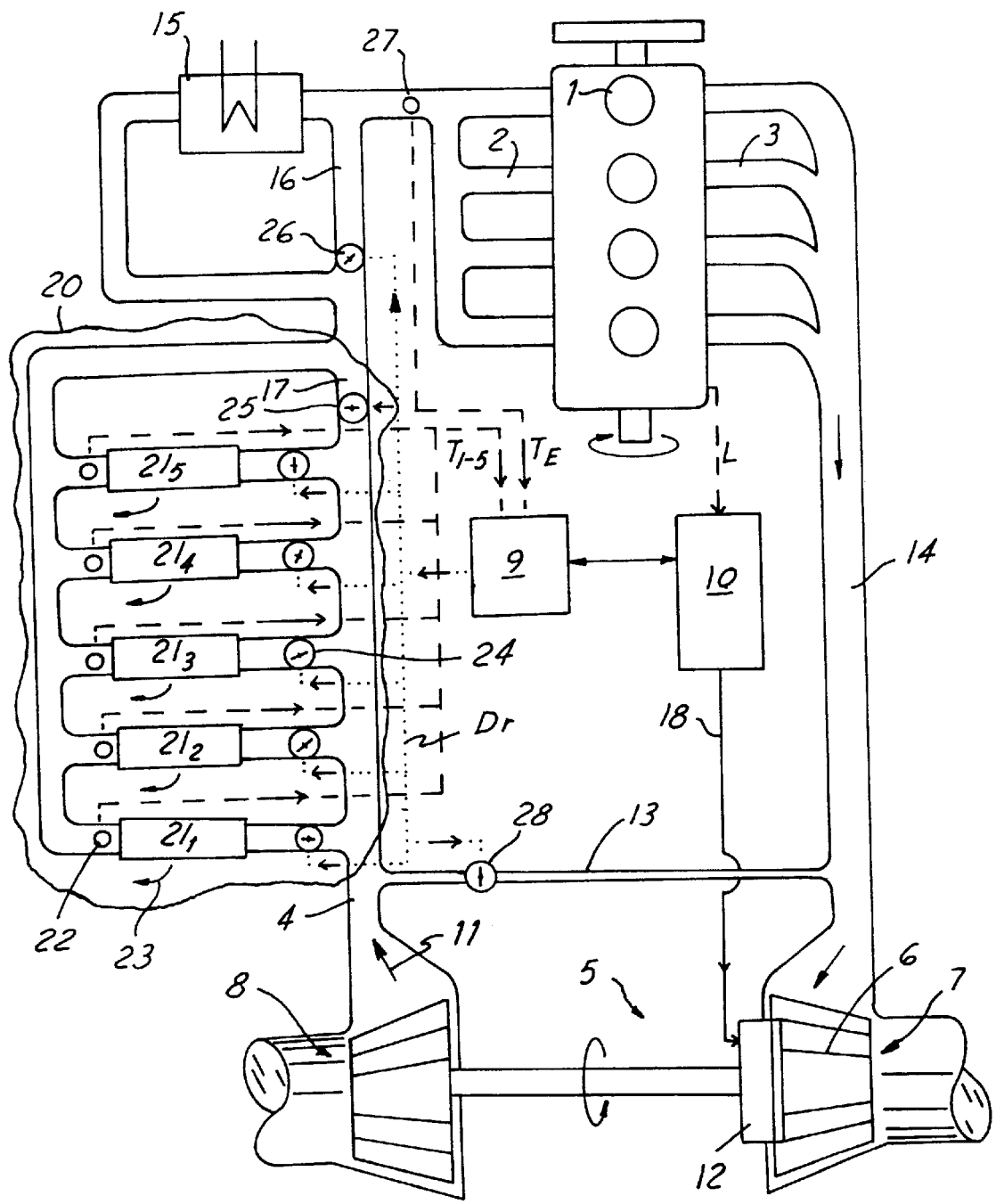

INTERNAL COMBUSTION ENGINE WITH VTG SUPERCHARGER

BACKGROUND OF THE INVENTION

Field of the Invention

This invention concerns a method for operation of an internal combustion engine with an exhaust gas turbocharger having a turbine portion with an adjustable turbine geometry controlled by a regulator mechanism to decrease the cross-sectional flow path leading to the turbine portion with increases of load on the internal combustion engine.

The power output of an internal combustion engine is proportionate to the volume of and density of air supplied for combustion with fuel. A turbocharger consists essentially of two turbine devices, specifically, an exhaust gas flow-driven turbine and an air compressor driven by the exhaust gas driven turbine. The turbine and the compressor are connected by a turbo-shaft and rotate synchronously. The mass flow of the supercharged charge air is a function of compressor speed. The air charge mass flow is delivered to the internal combustion engine intake through a charge air line.

The air pressure downstream of the compressor and the exhaust pressure upstream of the turbine reciprocally act on each other as a result of the momentary equilibrium communicated through the turbo-shaft. As a result of boost pressure acting on the compressor, exhaust gas is accumulated upstream of the turbine. Conversely, the dynamic pressure of the exhaust flow is translated into boost pressure in the charge air line in conformity with the pressure translation ratio of the exhaust gas turbocharger. The pressure translation ratio is determined by the respective cross-sections of the flows of exhaust to the turbine and of air from the compressor.

The amount of fuel required for a desirable mixture formulation of fuel/air for each combustion chamber of the internal combustion engine conforms with the momentary air thruput. With increasing output of the internal combustion engine, the demand or need for charge air increases, such that a correspondingly higher boost pressure of the turbocharger is needed. By means of an adjustable turbine geometry, e.g., adjustment of the angle of the turbine guide blades, the cross-section of flow to the turbine is changed. Resultantly, the dynamic energy imparted to the charge air by the compressor is varied. Under control of a charge regulator device, a turbine blade actuator acts to change the turbine geometry and bring the turbine geometry into a desirable operating position which produces a desired charge level. Resultantly, the cross-section of flow to the turbine is reduced with increasing engine output so that the turbocharger's rotative speed is increased which therefore increases compressor output and charge air mass flow through the charge air line to the internal combustion engine. This increase is proportioned to the increase in the operating condition of the engine.

In the operation of a supercharged internal combustion engine is that an ideal engine operating temperature, especially at low environmental temperatures, is difficult to achieve in a reasonable time and full functional capacity of the internal combustion engine is unavailable. As a result, the startup of accessory internal combustion engine units which utilize engine heat, for example, vehicle cab heating, is delayed.

SUMMARY OF THE INVENTION

The underlying objective of the invention is to enhance the heat generation capacity of the internal combustion engine and improve the ability to monitor the thermal balance of the quantity of heat required for various functions.

This objective is solved by this invention with methodology involving the use of a regulator mechanism to decrease the cross-sectional flow path to the turbine portion of a turbocharger in response to load increases imposed on the internal combustion engine.

In accordance with the invention, the aforementioned thermal balance is monitored by a thermoregulator, and the turbine geometry is adjusted by an actuator. When the thermoregulator determines that the engine's heat delivery should be increased, the cross-section of inlet flow to the turbine is reduced through adjustment of the turbine geometry. If additional heat delivery is needed, the actuator is energized to adjust the cross-section of inlet flow to the turbine from the position selected for the existing engine operating condition to a position which increases heat delivery. The reduction in the cross-section of the inlet flow increases turbocharger speed and causes the compressor consequently to deliver an increased air charge mass flow to the internal combustion engine intake. The increase in turbocharger speed and a corresponding increase in fuel mixed with the added air produces an excess combustion over and above what is called for by engine load. This increase in combustion produces a rapid heating of the internal combustion engine especially during the engine warm-up period.

The result of restricting the cross-section of flow to the turbine is increase in turbine intake pressure and temperature. Resultantly the output of the turbine is noticeably increased in the operating ranges of the internal combustion engine. Also, the compressor pressure ratio and compressor exhaust temperature also rise. In accordance with the invention, heat be extracted from the charge air mass flow to the engine by utilizing at least one heat exchanger to transfer heat from the charge air mass to a central working fluid which is fed to a separate thermal system. As the compressor draws in cold fresh air, the pressure and temperature are raised. The quantity of heat generated by the compressor is transferred by the heat exchanger great efficiency to the central working fluid in the heat exchanger and then fed to separate thermal system. By further adjustment of the turbine's geometry, towards a closed position characterized by minimal cross-section of the flow inlet to the turbine, the temperature of the charge air can be adjusted to an optimal level for the operation of the separate thermal system. The thermoregulator device is used to reduce the heat demand of the separate thermal system as needed and through adjustment of the turbine geometry modifies the charge air temperature.

The thermoregulator device establishes the thruput of the heat exchanger by a coordinated adjustment of a flow control valve located adjacent the intake of the heat exchanger and of a bypass valve positioned in a bypass line circumventing or bypassing the heat exchanger. By monitoring of the thermal balance and the additional heat generation produced by adjustment in the turbine geometry, several separate thermal systems each with a heat exchanger, can utilized. The thermal delivery of each separate thermal system is adjusted independently of each other by the thermoregulator. Useful applications of the quantity of heat which is extracted from the charge air are to warm up oil or fuel, to heat the oil pan and/or the fuel tank. For these purposes, the fuel tank or oil pan can be made of double-walled design and, therefore, provide a fluid flow space which allows cross-flow of the central working fluid of the heat exchanger. Heat transfer to the oil/fuel could also be produced by providing flow channels in the tank wall for conducting the central working fluid. The heat very quickly available downstream of the compressor can also be used for the heating a passenger cabin of a vehicle or for heating air used for vehicle windshield deicing. Finally, the hot charge air could also be used to more rapidly warm up the coolant of the internal combustion engine to the desired operating temperature.

BRIEF DESCRIPTION OF THE DRAWING

An exemplified embodiment of the invention is explained in greater detail in the description below on the basis of the drawing in which is shown a somewhat schematic view of: an internal combustion engine with an engine air inletting structure; an associated heat exchanger; an engine exhaust structure; and a turbocharger includes a compressor portion and a variable geometry turbine portion.

DESCRIPTION OF THE PREFERRED EMBODIMENT

The sole drawing shows an internal combustion engine 1 including an air intake system 2 and with an exhaust gas powered turbocharger 5 to generate a compressed air charge or air mass flow 11 in the intake tract or system 2 of the internal combustion engine 1. The exhaust gas turbocharger 5 consists of two turbo-engines, specifically a turbine portion 7 and a compressor portion 8 which are connected together in a mechanically rigid manner by a turbo-shaft so that the two turbo-engines rotate synchronously. The turbine portion 7 is arranged in the exhaust gas line 14 of the internal combustion engine and is driven by the exhaust gases of the engine which are accumulated in the exhaust tract or system 3 of the internal combustion engine. The compressor portion 8 is fluidly connected to an charge air line which leads to the intake system 2 of the internal combustion engine 1. The energy of the exhaust gas is extracted to rotate the turbine portion which in turn rotates the compressor 8 to pump and pressurize air in the compressor portion 8 in conformity with the ratio between accumulated exhaust pressure in front of the turbine 7 and boost pressure downstream of the compressor 8, i.e. a function of the ratio of the respective cross-section flow paths of both turbo-engines.

The flow of exhaust gas to the turbine is variable by adjusting the geometry of the turbine. Decreasing the cross-sectional area of the inlet for flow into the turbine 7, produces acceleration of the exhaust gas turbocharger 5, whereby compressor output rises and an increased charge air mass flow 11 is delivered to the intake system 2 of the internal combustion engine 1. With an increasing working load of the internal combustion engine the turbocharger 5 generates a higher boost pressure and higher charge air mass flow 11, such that a desired thruput or output of the internal combustion engine is produced. The adjustment to the inlet of the turbine portion 7 is carried out by an actuator device 12 which changes the turbine geometry 6. In the exemplified embodiment, the turbine guide grid can be variably adjusted with its guide blades in order to influence turbine geometry and flow behavior of the turbine 7.

A charge regulator device 10 controls the actuator device 12 and thus sets the turbine geometry to an desired operating point-specific position. The charge regulator 10 generates an actuation signal 18 that induces the actuator 12 to carry out the required adjustment of the turbine geometry so that it assumes a specified guide grid position. In response to the actuation command of the charge regulator, a cross-sectional flow configuration of the turbine 7 is achieved for interaction with the exhaust flow. A specific pressure translation ratio which determines the air charge mass flow is established for any given operating condition of the internal combustion engine.

Each operating point of the internal combustion engine 1 relates to a specific cross-section of flow configuration or geometry of the turbine 7. The flow configuration or inlet area decreases with increases in the load imposed on the engine, such that, the accumulated pressure of exhaust gas upstream of the turbine 7 accelerates the rotative speed of the exhaust gas turbocharger 5 and, consequently, the output of the compressor is increased. Each of the settings of the turbine geometry 6 allocated in each specific operating condition of the engine are plotted on a performance graph not shown here. The performance graph is referenced by the charge regulator device 10 to derive the desired turbine geometry 6 setting corresponding to the respective prevailing charge condition. The prevailing charge condition for the internal combustion engine 1 is inputted to the charge regulator device 10 by a charge signal $_L$.

During operation of the internal combustion engine, a thermoregulator 9 monitors the condition or configuration of the turbine geometry 6 and determines a thermal balance of heat needed to be generated for operation of the internal combustion engine. The cross-section of the inlet for flow to the turbine 7 is reduced when an increase in heat from the engine is desirable. Resultantly, the turbocharger speed is increased which increases the temperature and pressure downstream from the compressor and increases the quantity of fuel injected per cycle into each of the internal combustion engine's cylinders or combustion chambers in conformity with the increased air delivered by the compressor. The additionally injected fuel is burned in the cylinders without increasing the engine power but does produce increased development of heat. In particular, during an engine warm-up phase after start-up of the internal combustion engine, the engine can be quickly brought up to operating temperature and the thermal balance adjusted by the above described process. The shortening of engine warm-up time is especially desirable in cold seasons or in operation in northern regions. The operating temperature of the internal combustion engine 1 can be fed to the thermoregulator in order to determine thermal balance in a comparison with a desired operating temperature.

The thermoregulator 9 is connected to the charge regulator device 10 via a signal line which activates the charge regulator 10 to establish a desired turbine geometry adjustment taking into account the desired adjustment for the operating requirements of the engine and any of the additional needs for heat generation for the separate thermal systems as discussed above. The charge regulator device 10 receives the inputs related to the operation-dependent setting of the turbine geometry and additional adjustments specified by the thermoregulator 9 and determines the optimum turbine geometry setting of the inlet of the turbine 7. The regulator device 10 then generates a corresponding actuation signal 18 to the actuator 12. In determining the additional adjustment of the turbine geometry to increase heat generation, the thermoregulator 9 takes into consideration the current adjustment data or positioning of the turbine geometry 6 and the operating requirements of the internal combustion engine 1 as transmitted to the charge regulator 10.

The aforedescribed selective modification of effective heat generation of the internal combustion engine 1 through adjustment of turbine geometry is taken into account in the illustrated and described embodiment of the system, whereby a quantity of heat is extracted from the air charge mass flow 11 and directed to the separate thermal systems. A portion of the engine's air intake can be conducted through one or more heat exchangers $21_{1-5}$ and through which in each heat exchanger a central working flow 23 of a distinct fluid flows. During flow of the charge air through the heat exchanger heat is extracted from the charge air mass flow 11 and is transferred to the central working fluid 23 which in turn is delivered to a separate thermal system for a thermal application. As a result of the adjustment of the turbine geometry, intake pressure and temperature of the exhaust gas rises. Even with poor turbine efficiency, the turbine output is noticeably increased which consequently increases the compressor ratio (output pressure/input pressure) and the compressor exhaust temperature. Thus it can be understood that by changing the turbine geometry the temperature of the air exiting the compressor and, consequently, charge air temperature is selectively influenced.

In the exemplified embodiment as shown, several separate thermal systems are provided each including a heat exchangers $21_{1-5}$. The heat delivery of each thermal system is adjusted independently of each other by the thermoregulator 9. In the illustrated example, a heat exchanger $21_1$ is utilized to preheat engine lubrication oil of the internal combustion engine 1, whereby the central working fluid 23 heated by heat exchanger $21_1$ is fluidly connected to a double-walled construction (not shown) of the associated engine's oil pan. The warmed central working fluid of a further heat exchanger $21_2$ is used to heat fuel and is conducted, for example, to a fuel tank having a dual-walled construction. Alternately, the fluid can be utilized to heat the vehicle's fuel by fluidly connecting the heat exchanger to the injection system of the internal combustion engine. A further heat exchanger $21_3$ is provided for heating the vehicle's passenger compartment or for windshield heating. Under cold atmospheric conditions fast windshield deicing is therefore possible. The warmed fluid of a further heat exchanger 214 is coupled to the coolant circuit of the internal combustion engine 1 to produce quicker engine heating. Another heat exchanger $21_5$ is additionally provided to direct heat to a heat accumulator so that heat can be stored for latter use such as for supplementary heating of air, e.g., for the charge region of the engine whereby hydrocarbon emission can be lowered. This exhaust gas heat stored in the accumulator can subsequently be fed into the charge air and is explained in greater detail further below.

The thermoregulator 9 takes into consideration the heat requirement of the respective separate thermal systems in the determination of the thermal balance and modifies, if necessary, of the charge air temperature through adjustment of turbine geometry. The air thruput or flow through each of the heat exchangers $21_{1-5}$ is inputted to the thermoregulator 9. Physically, the heat exchangers $21_{1-5}$ are arranged in parallel line branches of the engine's charge air line 4, whereby a flow control valve 24 is provided in the intake of each heat exchanger $21_{1-5}$ and each valve 24 is respectively controlled by the thermoregulator 9 by an actuation signal $D_r$. Differing flows of air are produced through different charge air branch currents and heat individual heat exchangers $21_{1-5}$ by appropriate adjustment of the flow control valves 24. Consequently, desired levels of heat delivery to the separate thermal systems is assured. The parallel line branches provided respectively with a heat exchanger $21_{1-5}$ are constructed in a heat distribution section 20 as part of the charge air line 4. The heat distribution section 20 further has a bypass line branch 17 for flow of the charge air mass flow 11 thereby bypassing all heat exchangers $21_{1-5}$. Flow through the bypass line brunch 17 is controlled by a bypass valve 25 which is controlled or adjusted by the thermoregulator 9. The thermoregulator 9 determines the proportionate delivery of useful aggregate heat from the separate thermal systems by adjustment of the charge air thruput of each heat exchangers $21_{1-5}$ through coordination of the flow control valves 24. If a greater thermal demand is demanded from the separate thermal systems than is available from the charge air mass flow 11, i.e., an uncompensated heat balance exists, then a greater portion of air is routed through the bypass line branch 17 to the internal combustion engine.

The thermoregulator 9 utilizes a preset algorithm of interconnection priorities of the individual thermal systems so that the thermoregulator 9 is able to adjust flow of air through the heat exchangers with the supply of heat to important thermal systems assured.

Each heat exchanger $21_{1-5}$ is associated with a temperature sensor 22 for providing a temperature level indicating signal $T_{1-5}$ to the thermoregulator 9. From temperatures $T_{1-5}$ from the sensors 22 the thermoregulator 9 determines a desirable distribution of heat to the useful thermal systems and adjusts the flow by means of the control valves.

It is advantageous to cool the charge air mass flow 11 to a specified intake temperature $T_E$ prior to passage into the of the internal combustion engine 1. A charge air line cooler 15 is located adjacent to the heat distribution section 20 of the charge air line. Flow through the section 20 can be circumvented by flow through a cooler bypass 16 in the charge air line 4. A bypass valve 26 controlled by the thermoregulator 9 is arranged in the cooler bypass 16. Through adjustment of the bypass valve 26, the charge air branch flow conducted through the charge air cooler 15 is controlled and the charge air temperature supplied to the intake 2 of the internal combustion engine can be precisely set to the desired intake temperature $T_E$. The momentary intake temperature $T_E$ is measured by a temperature sensor 27 located in the intake tract 2 of the internal combustion engine 1 and that data is fed to the thermoregulator 9 which generates a control signal for the bypass valves 26. If necessary, the charge air cooler can be completely circumvented whenever the required intake temperature $T_E$ of the charge air exists.

The thermoregulator 9 further controls an exhaust gas recirculation or return valve 28 which directs a quantity of exhaust gas to the engine through a return line 13. The exhaust gas return line 13 extends between the exhaust gas line 14 of the internal combustion engine in front of or upstream of the turbine 7 and the charge air line 4 in front of or upstream of the heat distribution section 20. By opening the exhaust gas return valve 28, the charge air temperature is further raised through injection of hot exhaust gases. Resultantly, when the heat supply demand of all useful thermal systems is high, the thermal balance can be equalized through opening of the exhaust gas return valve 28. The provision of recirculating or returning exhaust gases lowers the combustion temperature in order to reduce nitrogen oxide emissions of the internal combustion engine. The adjustment of heat distribution to the separate thermal systems as previously described is thus used to control the cooler bypass valve 26 in setting engine intake temperature to the specified value $T_E$. For purposes of better overview, the qualitatively independent actuation signals $D_r$ generated by the thermoregulator 9 for the flow control valves are collectively represented in the drawing.

What is claimed is:

1. An improved system for the operation of an internal combustion engine (1) having a turbocharger (5) including an exhaust gas receiving turbine portion (7) which has an adjustment mechanism for changing the cross-sectional configuration of the inlet to the turbine and including a compressor portion (8) operably connected to the turbine portion for delivering a mass flow air charge (11) to an air intake assembly (2) of the internal combustion engine (1) which includes an air charge line (4), for delivering an amount of fuel as required by the internal combustion engine (1) to the charge air in conformity with the instantaneous internal combustion engine (1) air flow and an actuator (12) which adjusts the inlet adjusting mechanism of the turbine, whereby the cross-section of exhaust gas flow to the turbine (7) is reduced in response to an increasing working load of the engine, the improvement comprises: a thermoregulator (9) which monitors a thermal balance of the quantity of heat to be generated by the internal combustion engine (1) and required by operation of the engine at particular settings of the adjustable cross-sectional inlet of the turbine by the actuator (12), whereby the cross-sectional configuration for flow into the turbine (7) is reduced to increase turbocharger speed and its heat delivery, a heat exchanger is positioned to transfer heat from the mass air charge (11) to a separate thermal system for a thermally related application, a flow control valve (24) at the intake of the heat exchanger controlled by the thermoregulator (9) to determine a desirable air flow through the heat exchanger, a bypass line (17) which circumvents the air flow through the heat exchanger, and a bypass valve (25) controlling flow through the bypass line.

2. The improved system for operation of an internal combustion engine as set forth in claim 1 in which the thermoregulator (9) determines the proportionate flow of air through the heat exchanger and through the bypass line (17) by controlling the bypass valve (25).

3. The improved system for operation of an internal combustion engine as set forth in claim 1 in which more than one heat exchanger and separate thermal systems are provided, and the thermoregulator independently controls the thermal delivery of each system.

4. The improved system for operation of an internal combustion engine as set forth in claim 3 wherein the thermoregulator (9) determines the proportionate delivery of heat from each related thermal system by control of the flow of air through each heat exchanger.

5. The improved system for operation of an internal combustion engine as set forth in claim 4 wherein the thermoregulator (9) independently controls the flow control valves (24) to accommodate the demands on the separate thermal systems.

6. The improved system for operation of an internal combustion engine as set forth in claim 3 wherein the thermoregulator (9) determines the distribution of heated air to the related thermal systems by independent control of the flow control valves (24) in accordance with a temperature of the air passing downstream from the heat exchangers.

7. An internal combustion engine having a turbocharger (5) which includes an exhaust gas receiving turbine portion (7) has an adjustment mechanism for changing the cross-sectional configuration of the inlet to the turbine and includes a compressor portion (8) operatively connected to the turbine portion (7), for developing air flow through a line (4) to the air intake assembly (2) of the internal combustion engine (1), and having a charge regulator (10) controlling an actuator (12) for the adjustment mechanism through a control line which transmits an actuation signal (18) wherein the adjustment mechanism is set to a desired condition, whereby the cross-sectional configuration of the turbine inlet can be decreased in response to a increasing load on the engine, and at least one heat exchanger is positioned to receive air flowing from the compressor so as to heat another working fluid associated with the heat exchanger which is then passed to a related thermal system for a thermally related application, a flow control valve (24) controlled by the thermoregulator (9) regulates flow of air directly to the heat exchanger, and a bypass line (16) circumvents air flow about the heat exchanger, and another control valve (26) associated with the bypass line and also controlled by the thermoregulator (9) regulates flow of air around the heat exchanger.

8. The internal combustion engine as set forth in claim 7 wherein more than one separate thermal systems are provided, each including a heat exchanger positioned in separate and parallel branches.

9. The internal combustion engine as set forth in claim 8 wherein a thermoregulator device (9) is utilized to actuate the flow control valves in a synchronized mode.

10. The internal combustion engine as set forth in claim 9 wherein the thermoregulator (9) and charge regulator (10) are operatively connected and a signal are generated to control the turbine inlet mechanism to decrease the turbine inlet configuration and thus increase the speed of the turbocharger which in turn increases the air temperature down stream of the compressor portion.

11. The internal combustion engine as set forth in claim 7 wherein a temperature sensor (22) associated with each heat exchanger is positioned downstream therefrom and operably connected to the thermoregulator (9).

12. The internal combustion engine as set forth in claim 7 wherein a heat exchanger (15) is positioned downstream from the parallel line branches of the other heat exchangers for the purpose of cooling the air flow to the engine, and a cooler bypass line (16) circumvents the heat exchanger (15).

13. The internal combustion engine as set forth in claim 12 wherein a bypass valve (26) is placed in the cooler bypass line (16) and is controlled by the thermoregulator (9).

* * * * *